US008997789B2

(12) United States Patent
Pozniak

(10) Patent No.: US 8,997,789 B2

(45) Date of Patent: Apr. 7, 2015

(54) INTERNAL LEAK DETECTION AND BACKFLOW PREVENTION IN A FLOW CONTROL ARRANGEMENT

(75) Inventor: Peter M. Pozniak, San Jose, CA (US)

(73) Assignee: Malema Engineering Corporation, Boca Raton, FL (US)

(*) Notice: Subject to any disclaimer, the term of this patent is extended or adjusted under 35 U.S.C. 154(b) by 854 days.

(21) Appl. No.: 12/435,666

(22) Filed: May 5, 2009

(65) Prior Publication Data

US 2009/0314369 A1 Dec. 24, 2009

Related U.S. Application Data

(60) Provisional application No. 61/118,765, filed on Dec. 1, 2008, provisional application No. 61/074,663, filed on Jun. 22, 2008.

(51) Int. Cl.
*F16K 1/00* (2006.01)
*F17D 5/02* (2006.01)

(52) U.S. Cl.
CPC .......................................... *F17D 5/02* (2013.01)

(58) Field of Classification Search
CPC .......................................................... F17D 5/02
USPC ........... 137/597, 561, 599.03–599.04, 1, 861, 137/583–587, 215–218, 240
See application file for complete search history.

(56) References Cited

U.S. PATENT DOCUMENTS

| | | | | |
|---|---|---|---|---|
| 5,574,213 | A * | 11/1996 | Shanley | 73/40.7 |
| 5,887,974 | A * | 3/1999 | Pozniak et al. | 366/136 |
| 5,944,043 | A * | 8/1999 | Glick et al. | 137/1 |
| 6,019,250 | A * | 2/2000 | Pozniak et al. | 222/1 |
| 7,032,435 | B2 * | 4/2006 | Hassenflug | 73/46 |
| 2005/0109399 | A1 * | 5/2005 | Wodjenski et al. | 137/240 |
| 2006/0000509 | A1 * | 1/2006 | Pozniak | 137/487.5 |

OTHER PUBLICATIONS

PCT International Search Report and Written Opinion, PCT Application No. PCT/US09/46806, Jul. 23, 2009, 8 pages.

* cited by examiner

*Primary Examiner* — Len Tran
*Assistant Examiner* — Joel Zhou
(74) *Attorney, Agent, or Firm* — Fenwick & West LLP

(57) ABSTRACT

An apparatus for preventing backflow and contamination, and detecting by-pass leaks in a flow control arrangement is disclosed. The apparatus includes a vent line connecting a sweep gas source and a vent. Constant process-inert gas flows from the source through the vent line into the vent. The vent line is connected with the flow control arrangement. Any leakage in the flow control arrangement is channeled to the vent line and swept into the vent along with the sweep gas. As a result, pressure in the flow control arrangement cannot build up and leakage backflow is prevented. A flow switch may be disposed on the vent line for detecting leakage. The sweep gas flow rate is controlled at a constant level that is inadequate to actuate the flow switch and keeps the flow switch ready to actuate by any superimposed leakage. The flow switch detects a leakage when it actuates.

5 Claims, 7 Drawing Sheets

INTERNAL LEAK DETECTION AND BACKFLOW PREVENTION IN A FLOW CONTROL ARRANGEMENT

CROSS-REFERENCE TO RELATED APPLICATION

This application claims the benefit of U.S. Provisional Application No. 61/118,765, filed Dec. 1, 2008, and U.S. Provisional Application No. 61/074,663, filed Jun. 22, 2008, both of which are hereby incorporated by reference in their entirety.

BACKGROUND

1. Field of the Invention

The present invention relates generally to flow control. In particular, the present invention is directed towards leak detection and backflow prevention (i.e., backflow reduction).

2. Description of Background Art

In many industries it is common practice to interconnect pressurized bulk liquid delivery systems for serving various processes. For example, in the semiconductor industry, most liquid chemistries are delivered under pressure to the wafer fabricating tools. Some of these chemistries are volatile, hazardous, toxic or otherwise chemically aggressive. It is often desirable to provide for the connection of facilities like deionized (DI) water to these bulk distribution systems providing a convenient method to flush-out and neutralize these chemical hazards for process reasons, including for example maintenance.

When two or more liquid delivery systems are interconnected (e.g., for process reasons) there is the potential for cross contamination. These intentional cross connections are often accomplished using valves such as check valves and three-way (or three-port) selector valves. If a small, internal leak (sometimes called a by-pass leak) occurs, the two or more liquids can migrate back and forth across the leaking valve seats contaminating or diluting the process chemistries.

In reality, all valves leak and check valves are particularly bad. Final test criteria for all valve manufacturers is essentially an acceptable leak rate. As valves age and normal wear takes place, leak rates increase. The problem leakage is reverse flow (or backflow). Often these reverse flows occur at very low flow rates [<5 ml/min] and are very difficult to detect. Yet these small leaks allow contamination or dilution of the cross connected liquids.

Backflow can cause expensive damage. High tech processes utilize high purity chemistries to ensure maximum yields and predictable performance. High purity chemistries are expensive. High tech manufacturing tools and fabrication facilities are also expensive. Cross contamination caused by backflow may lead to loss of productivity, reduced yields and semiconductor fabrication plant (FAB) shut downs. Unplanned shut downs to repair/replace leaking components and cleanup contaminated plumbing systems reduce financial performance and introduce unexpected delays into tight delivery schedules. It may take a long time before a small leak is discovered, resulting in the loss of much product and productivity. In bioprocesses, a single malevolent bacteria can ruin a whole batch, perhaps thousands of liters. In medical applications, contaminations can lead to illness, injury or worse.

In addition to contributing to backflow, by-pass leakages also waste valuable chemistries, damage expensive equipment, thereby causing excessive waste. Traditionally, by-pass leakages are detected through visual inspection, which is very insufficient because it is often difficult and time consuming. In addition, there are portions of systems that are difficult or impossible to view, and very small or intermittent leaks are easily overlooked.

Thus, there is a need for an ultra-sensitive leak detection device and a backflow prevention device for critical (or ultra high purity) materials applications.

SUMMARY

The present invention overcomes limitations of the prior art by providing a backflow prevention device that sweeps away any liquid leakage using a continuous flow of sweep gas, and a leak detection device that can detect liquid leakage at very low flow rate. This prevents expensive damage that may be caused by backflow and/or leakage and saves chemistries that may be leaked away.

According to one aspect of the present invention, an apparatus for reducing backflow comprises a supply inlet adapted to be connected to a supply source for a liquid; a supply line connecting the supply inlet to a point of use outlet, the supply line comprising a first valve, a first vessel, and a second valve in that order; a sweep gas inlet adapted to be connected to a sweep gas source for a continuous flow of sweep gas, the sweep gas being inert relative to the liquid (and/or relative to the process served); a vent line connecting the sweep gas inlet to a vent outlet; a branch line connecting the first vessel to the vent line, the branch line comprising a vent valve; and a control system that (1) in a liquid supply state, opens the first valve and the second valve and closes the vent valve, and (2) in a stop state, closes the first valve and the second valve and opens the vent valve. When changing from one state to another state, the various valves involved preferably are simultaneously opened and closed, or are opened and closed in a timing that preferably reduces backflow during the transition.

According to another aspect, an apparatus for reducing backflow comprises a supply inlet adapted to be connected to a supply source for a liquid; a first valve, a first vessel and a second valve connecting the supply inlet to a point of use outlet; a sweep gas inlet adapted to be connected to a sweep gas source, the sweep gas being inert relative to the liquid (and/or to the process served); a vent line connecting the sweep gas inlet to a vent outlet; a vent valve connecting the first vessel to the vent line; and a control system that (1) in a liquid supply state, opens the first valve and the second valve and closes the vent valve, and (2) in a stop state, closes the first valve and the second valve and opens the vent valve.

According to another aspect, an apparatus for reducing backflow in a flow control arrangement comprises a sweep gas inlet adapted to be connected to a sweep gas source, the sweep gas being inert relative to a pressurized liquid being distributed in the flow control arrangement; a vent line connecting the sweep gas inlet to a vent outlet; means connecting the vent line to the flow control arrangement; and a control system that (1) in a liquid supply state, prohibits the sweep gas from entering the flow control arrangement and prohibits the pressurized liquid from entering the vent line, and (2) in a stop state, permits the sweep gas to enter the flow control arrangement and permits the pressurized liquid to enter the vent line.

According to another aspect, an apparatus for reducing backflow in a flow control arrangement comprises a sweep gas inlet adapted to be connected to a sweep gas source, the sweep gas being inert relative to a pressurized liquid being distributed in the flow control arrangement; a vent line connecting the sweep gas inlet to a vent outlet; and a one-way valve connecting the flow control arrangement to the vent line, the one-way valve closes when the pressurized liquid is distributed in the flow control arrangement.

According to another aspect, an apparatus for detecting leaks in a flow control arrangement comprises a sweep gas inlet adapted to be connected to a sweep gas source for a continuous flow of sweep gas at a constant flow rate, the sweep gas being inert relative to a liquid being distributed in the flow control arrangement; a vent line connecting the sweep gas inlet to a vent outlet; a branch line connecting the vent line to the flow control arrangement; and a flow switch disposed on the vent line between the branch line and the vent outlet for sensing fluid flowing through the vent line into the vent outlet, the flow switch configured to actuate in response to fluid passing through the vent line into the vent outlet exceeding the constant flow rate, wherein the fluid comprises the sweep gas and any leaked liquid.

According to another aspect, an apparatus for detecting leaks in a flow control arrangement comprises a sweep gas inlet adapted to be connected to a sweep gas source for a continuous flow of sweep gas at a constant flow rate, the sweep gas being non-reactive relative to a liquid being distributed in the flow control arrangement (and/or to a process served); a vent line connecting the sweep gas inlet to a vent outlet; a branch line connecting the vent line to the flow control arrangement; and means for sensing fluid flowing through the vent line into the vent outlet, the means configured to activate in response to fluid passing through the vent line into the vent outlet exceeding the constant flow rate, wherein the fluid comprises the sweep gas and any leaked liquid.

According to another aspect, a method for detecting leaks in a flow control arrangement comprises providing a continuous flow of sweep gas at a constant flow rate through a vent line to a vent outlet; adjusting a flow switch disposed on the vent line to actuate in response to fluid passing through the vent line into the vent outlet exceeding the constant flow rate; receiving a signal indicating that no flow should enter the vent line from the flow control arrangement; opening a vent valve disposed on a branch line connecting the vent line to the flow control arrangement, the flow switch located between the branch line and the vent outlet; detecting that the flow switch actuates; and generating a signal indicating that a leak occurring in the flow control arrangement has been detected.

According to another aspect, an apparatus for reducing backflow and detecting leaks in an interconnected pressurized liquid delivery system comprises a first supply inlet adapted to be connected to a first supply source for a first liquid; a first supply line connecting the first supply inlet to a point of use outlet, the first supply line comprising a first valve, a first vessel, and a second valve in that order; a second supply inlet adapted to be connected to a second supply source for a second liquid; a second supply line connecting the second supply inlet to the point of use outlet, the second supply line comprising a third valve, a second vessel, and a fourth valve in that order; a sweep gas inlet adapted to be connected to a sweep gas source for a continuous flow of sweep gas at a constant flow rate, the sweep gas being inert relative to the first liquid and the second liquid; a vent line connecting the sweep gas inlet to a vent outlet; a first vent valve connecting the vent line with the first vessel; a second vent valve connecting the vent line with the second vessel; a flow switch disposed on the vent line between the two vent valves and the vent outlet for sensing fluid that flow through the vent line into the vent outlet, the flow switch configured to actuate responding to fluid passing through the vent line into the vent outlet exceeding the constant flow rate, wherein the fluid comprises the sweep gas and any leaked liquid; and a control system that (1) in a first liquid supply state, opens the first valve, the second valve, and the second vent valve, and closes the third valve, the fourth valve, and the first vent valve, (2) in a second liquid supply state, opens the third valve, the fourth valve, and the first vent valve, and closes the first valve, the second valve, and the second vent valve, and (3) in a stop state, closes the first valve, the second valve, the third valve, the fourth valve, and opens the first vent valve and the second vent valve.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

FIGS. (FIGS.) 1A-B are diagrams of an apparatus for preventing backflow in a flow control arrangement according to one embodiment.

DETAILED DESCRIPTION

The following disclosure and accompanying drawings describe various embodiments that prevent backflow and resulting contamination, and/or detect by-pass leaks in flow control arrangements that dispense liquids (e.g., water, watery mixture such as slurry).

Backflow Prevention Device

Figure 1A:
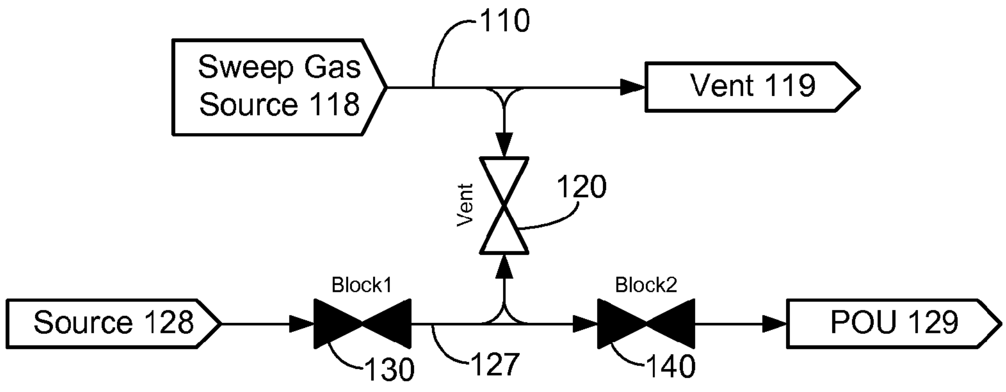
FIG. 1C is a diagram of an apparatus for preventing backflow in a flow control arrangement according to another embodiment.
Figure 1B:
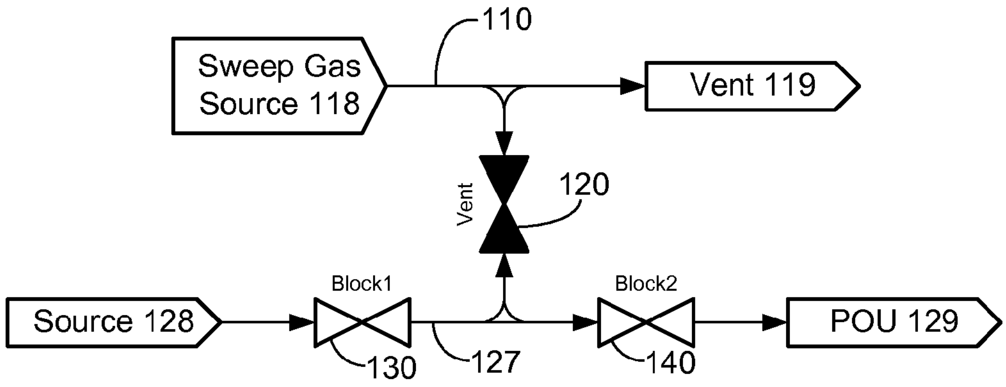

FIGS. 1A and 1B show a backflow prevention device for a flow control arrangement according to one embodiment. As shown, the backflow prevention device includes a vent line (also called drain line) 110 and a vent valve 120. The vent line 110 has a sweep gas inlet connected to a sweep gas source 118 and a vent outlet connected to a vent 119. The sweep gas source 118 provides a continuous flow of sweep gas through the vent line 110 into the vent 119. The vent valve 120 is disposed on a branch line connecting the vent line 110 with the flow control arrangement.

The flow control arrangement shown in FIGS. 1A, 1B includes a supply line having a supply inlet connected to a source 128 and a point of use (POU) outlet connected to a POU 129. The supply line includes a vessel 127 and two block valves 130, 140. One of ordinary skill would readily recognize that the flow control arrangement can be any flow control arrangement that is susceptible to backflow, such as a pressurized liquid delivery system. Examples of the liquid in the flow control arrangement include chemical mechanical polishing slurry and deionized water. In one embodiment, the vent valve 120 and the block valves 130, 140 are pneumatic valves controlled by a control system (not shown). In other embodiments, the valves can be electrically, mechanically, or hydraulically actuated valves controlled by the control system.

According to one embodiment, the sweep gas is a process-inert gas that does not contaminate the liquid passing through the flow control arrangement for purpose of the underlying process(es) (e.g., subsequent chemical process or bioprocess that the liquid participates). Depending on the liquid and the underlying process(es), the process-inert gas may be non-reactive to the liquid, non-catalytic, and/or non-contaminating. For example, if the liquid being dispensed is deionized water and oxygenated water is deleterious to the underlying process (e.g., because oxygen helps support bacteria), oxygen cannot be used as the sweep gas, even though oxygen does not react with the deionized water. Examples of the process-inert gas include air (e.g., in domestic water systems), purified nitrogen (e.g., in semiconductor fabrication plants), and argon-helium mixture gas, to name a few. As another example, carbon dioxide can be considered process-inert when used to blanket flammable petroleum storage tanks.

FIG. 1A illustrates a stop state of the flow control arrangement. In this state, both block valves 130, 140 are closed, and the vent valve 120 is open (active). If any liquid is leaked through the block valves 130, 140, the leaked liquid would be swept out through the vent line 110 along with the sweep gas. Because of the constant flow of sweep gas in the vent line 110, there will not be enough pressure in the flow control arrangement to force the leaked liquid from the vessel 127 through the block valves 130, 140.

Backflows only occur when the supply pressure drops below the dispense pressure of the interconnected supply. For example, a loss of supply pressure in the source 128 may cause vacuum to develop near the source end of the block valve 130. The vacuum may be a result of the siphon effect—when the pressure exerted by the weight of the liquid in the supply line equals or exceeds the diminishing source pressure, the vacuum forms near the source end of the block valve 130. The vacuum may cause backflow by sucking liquid through leaking valves. The backflow prevention device breaks the backflow siphon by channeling leaked liquid to the vent 119 through the vent line 110 and filling the space between the block valves 130, 140 with the process-inert gas. Therefore, if there is any vacuum developed within the flow control arrangement and a block valve leaks, only the process-inert gas is sucked in, and thereby prevents the distributed liquid from being contaminated.

FIG. 1B shows an open state (or liquid supply state) of the flow control arrangement. In this state, both block valves 130, 140 are open, and the vent valve 120 is closed (inactive). Similarly, if the vent valve 120 leaks, the leaked liquid will be swept out through the vent line 110. If any process-inert sweep gas is sucked in through the leaked vent valve 120, it will not contaminate the distributed liquid.

According to one embodiment, the control system (not shown) for the flow control arrangement shown in FIGS. 1A-B can have two states: a liquid supply state and a stop state. In the liquid supply state, the control system opens the block valves 130, 140 to let the liquid passes through the supply line and closes the vent valve 120 to prevent the liquid from entering the vent line 110. In the stop state, the control system opens the vent valve 120 to allow the sweep gas to enter the vessel 127 and closes the block valves 130, 140 to prevent the liquid from passing through the supply line.

Figure 1C:
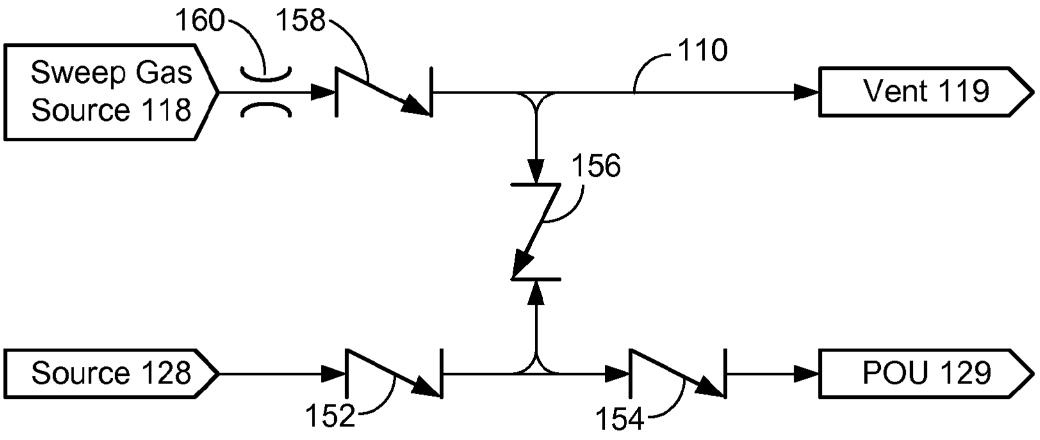

FIG. 1C illustrates another implementation of the backflow prevention device for a flow control arrangement according to one embodiment. As shown, the backflow prevention device includes a vent line 110 having a sweep gas inlet connected to a sweep gas source 118 and a vent outlet connected to a vent 119. The vent line 110 passes through an orifice (or a flow rate controller) 160, and a check valve (or one-way valve) 158. The orifice 160 functions to control a flow rate of the sweep gas. The check valve 158 functions to ensure that the sweep gas and any liquid leakage move down the vent line 110 and do not backflow into the sweep gas source 118. The backflow prevention device is connected with the flow control arrangement through a check valve 156. The flow control arrangement includes two check valves (or one-way valves) 152, 154. The check valves allow liquid to flow in one direction only (as indicated by their arrows). Therefore, when liquid is transmitted from the source 128 to the POU 129 the supply liquid pressure would close the check valve 156, preventing the liquid from entering the vent line 110. When the transmission stops, the lack of supply liquid pressure would cause the check valve 156 to open, causing any liquid leaked through check valves 152, 154 to flow through the check valve 156 along with the sweep gas, and be swept out through the vent line 110.

One advantage of the implementation illustrated in FIG. 1C is that no operation is required to control the check valves and prevent backflow contamination in the flow control arrangement.

Leak Detection Device

Figure 2A:
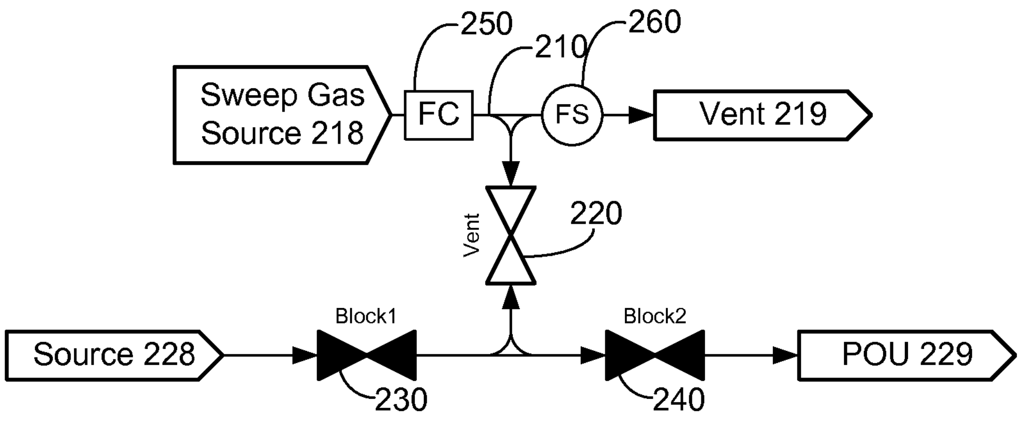
FIGS. 2A-B are diagrams of an apparatus for preventing backflow that includes facilities for detecting internal leaks in a flow control arrangement according to one embodiment.
Figure 2B:
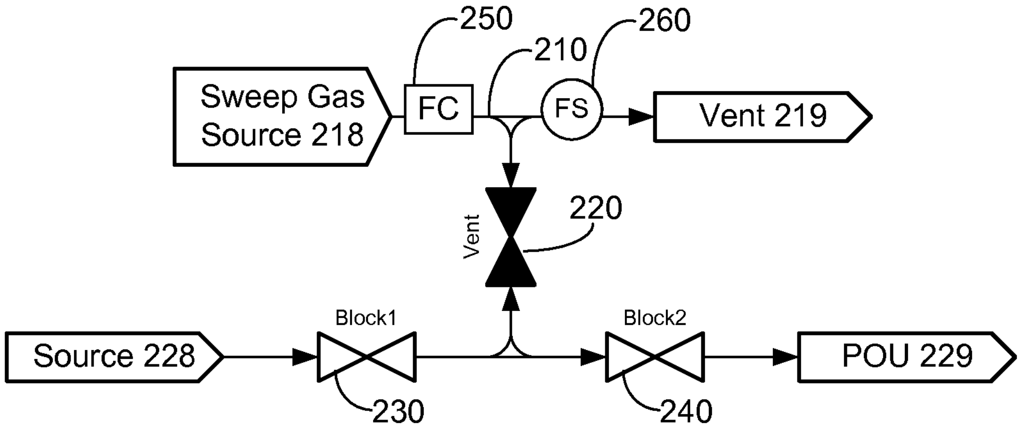

FIGS. 2A and 2B show a leak detection device for a flow control arrangement according to one embodiment. The leak detection device detects ultra low level leaks by providing a preload of process-inert sweep gas on a flow switch, where the preload is too low to cause switch actuation. Additional mass in the flow stream (as in a single drop of liquid) causes the switch to actuate (or trip) and provide indication of a leak (e.g., a by-pass leak).

The leak detection device shown in FIGS. 2A and 2B, similar to the backflow prevention device shown in FIGS. 1A and 1B, includes a vent line 210 having a sweep gas inlet connected to a sweep gas source 218 and a vent outlet connected to a vent 219. The vent line 210 is preloaded with constant process-inert sweep gas flow (e.g., purified nitrogen). A vent valve 220 connects the leak detection device with the flow control arrangement. In addition, the leak detection device is equipped with a flow rate controller 250 on the vent line 210 near the sweep gas inlet, and a flow switch 260 on the vent line 210 near the vent outlet.

In one embodiment, the flow switch 260 is a standard flow switch or sensor (e.g., magnetic piston and reed switch, Hall effect sensor) operating in a bi-phase flow environment that either actuates (or trips) or not based on the flow rate of mass flowing past it. Examples of the flow switch 260 include Malema™ flow switch models M-60, M-61, and M-62. The flow rate controller 250 controls the flow rate of the sweep gas, and is adjusted to set its flow rate at a constant rate through the vent line 210. The flow rate is set at a level that is inadequate to actuate the flow switch 260, but keeps the flow switch 260 ready to actuate, with any additional mass (e.g., a drop of leaked liquid (approximately 65 microliters)) through the vent line 210 actuating the flow switch 260. The flow rate will vary depending on the situation. In some cases, the flow rate ranges from approximately 5 to 20 SCFH (Standard Cubic Feet per Hour). This flow rate is also called a preload flow rate or a predetermined flow rate. When the flow switch 260 actuates, it generates a pulse signal (i.e., the actuate signal) indicating so. Therefore, each leaking incidence would trigger the flow switch 260 to generate a pulse signal. The flow switch 260 can have an output of its signal to a control system (not shown).

FIG. 2A illustrates a stop state of the flow control arrangement. In this state, both block valves 230, 240 are closed, and the vent valve 220 is open (active). Similar to the stop state illustrated in FIG. 1A, liquid leaked through one block valve will be swept through the vent line 210 and would not backflow through the other block valve. In addition, because the sweep gas flow rate is adjusted to keep the flow switch 260 barely from actuating, the leaked liquid through the vent line 210 would actuate the flow switch 260. As a result, the control system would detect the leak.

FIG. 2B shows an open state of the flow control arrangement. In this state, both block valves 230, 240 are open, and the vent valve 220 is closed (inactive). If the vent valve 220 leaks, the flow switch 260 would detect the leak when leaked liquid passes through it.

Proper function of the leak detection device can be conveniently and routinely validated. For example, the block valve 230 and the vent valve 220 can be controlled to open, for example, to flush the vent line 210. The flow switch 260 actuates whenever flushes occur. Because the actuation of the flow switch 260 is expected in such a circumstance, the control system can be configured to treat such actuate signals as a validation that confirms the leak detection device functions as expected and safely ignore them. If the actuate signal is not generated when expected, the control system can properly determine that a malfunction has occurred, e.g., either the flow switch 260 malfunctioned, or the valves 220, 230 malfunctioned, or there is no liquid in the source 228. Once the valves 220, 230 are closed, the control system can resume monitoring actuate signals for leak indications.

One of ordinary skill would readily recognize that the leak detection device can be implemented in other variations and incorporated into any flow control arrangement that is susceptible to leaks. For example, the vent valve 220 shown in FIGS. 2A and 2B functions to permit leaks and the sweep gas to go through the vent valve 220 when open, and to prohibit liquid and the sweep gas from passing when closed.

Backflow Prevention And Leak Detection Device

Figure 3A:
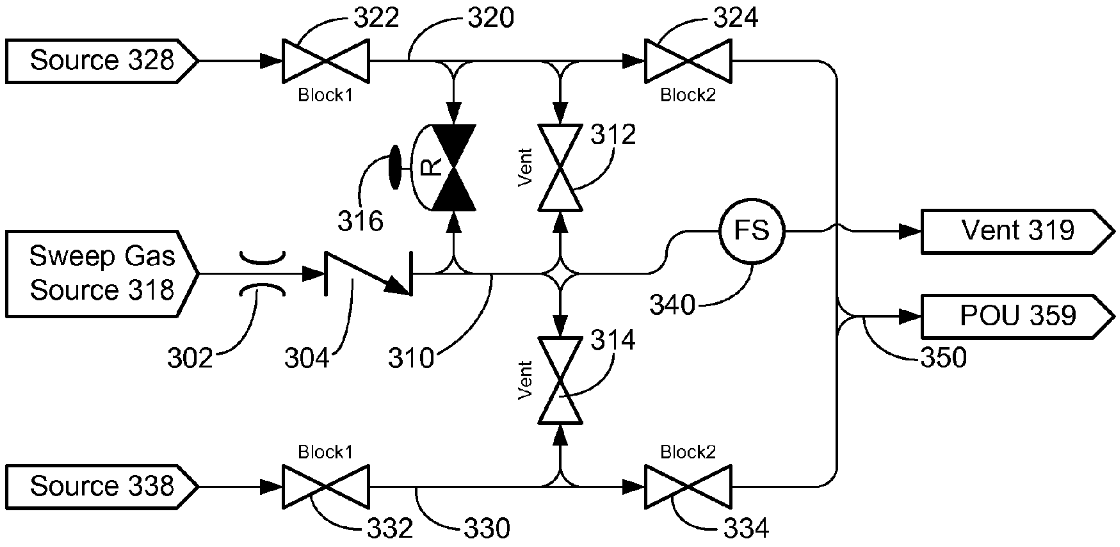
FIGS. 3A-I are representative diagrams of a dual-channel apparatus for preventing backflow and detecting internal leaks in a flow control arrangement according to one embodiment.

FIG. 3A shows a dual-channel backflow prevention and leak detection device according to one embodiment. The device provides and maintains a vented section of plumbing between two pressurized liquids ensuring that even if a leak develops in the interconnecting valve train, the path of least resistance is to a drain and monitored by a flow switch (also known as a leak-detecting sensor). The device operates to prevent such cross contamination regardless of valve seat integrity, and detects such leak at its first occurrence. The device also utilizes a process-inert sweep gas to keep air and other potential contaminants at bay.

As illustrated in FIG. 3A, one embodiment of the device includes eight valves: a vent valve 312 for connecting a supply line 320 and a vent line 310, a vent valve 314 for connecting a supply line 330 and the vent line 310, two block valves 322, 324 on the supply line 320, two block valves 332, 334 on the supply line 330, a restricted flow valve (also called a drain flush valve) 316 connecting the supply line 320 and the vent line 310, and a check valve 304. Some or all of these valves can be pneumatically, manually, electrically, mechanically, or hydraulically actuated valves. According to one embodiment, some or all of these valves are connected to a control system (not shown) which provides control signals for the valves to function accordingly.

The vent line 310 has a sweep gas inlet connected to a sweep gas source 318 and a vent outlet connected to a vent 319, and is equipped with an orifice (or a flow rate controller) 302 and the check valve 304 near the sweep gas inlet, and a flow switch 340 near the vent outlet. Similar to the leak detection device described above with respect to FIGS. 2A and 2B, a steady flow of process-inert sweep gas (e.g., purified nitrogen (PN2) gas, humidified PN2 gas) passes through the vent line 310. The orifice 302 is configured to control a flow rate of the sweep gas such that it preloads but does not actuate the flow switch 340. The presence of even a very small amount of liquid superimposed on the continuous process-inert gas flow causes the flow switch 340 to actuate quickly at ultra low flow rates and provide alarm notification of the leak event. The flow switch 340 connects to the control system and transmits actuate signals to the control system. The check valve 304 functions to ensure that the sweep gas and any liquid leakage move down the vent line 310 and do not backflow into the sweep gas source 318.

According to one embodiment, the device is used in a semiconductor fabrication plant and dispenses chemical mechanical polishing (CMP) slurry and ultra high purity (UHP) deionized water. One skilled in the art would understand that the device can be used in other industries and dispense other types of liquid. In this particular embodiment, the slurry is supplied from a source 338 through the supply line 330 and a dispense line 350 to a point of use (POU) 359. The water is supplied from a source 328 through the supply line 320 and the dispense line 350 to the POU 359.

Based on the control signals received from the control system, the device can selectively dispense slurry or water through the dispense line 350, or not dispense at all. Escaped slurry or water caused by internal leakage is dispensed with the process-inert sweep gas through the vent line 310. In addition, the process-inert sweep gas also fills any vacuum developed within the device (e.g., due to loss of supply pressure in the source). Because the backfill material is a process-inert gas, it will not contaminate or dilute the dispensed liquid (e.g., UHP DI water, CMP slurry).

The control system periodically opens the restricted flow valve 316 to sweep the vent line 310 with deionized water to flush any slurry that may have been deposited in the vent line 310. Because the flush triggers the flow switch 340 to actuate, the control system uses the actuate signal to verify that the device functions normally. After the flush finishes (e.g., seconds or minutes after the restricted flow valve 316 is closed), the control system can resume monitoring the actuate signal from the flow switch 340 for leak detection.

The control system includes logic that generates the control signals for valves and monitors the actuate signals received from the flow switch 340. In one implementation, the control system uses pneumatic logic, which uses compressed gases (usually air or nitrogen) and pneumatic circuits to generate control signals that can be used to operate valves and other control systems. In another implementation, the control system uses electronics and software to implement the logic.

Figure 3B:
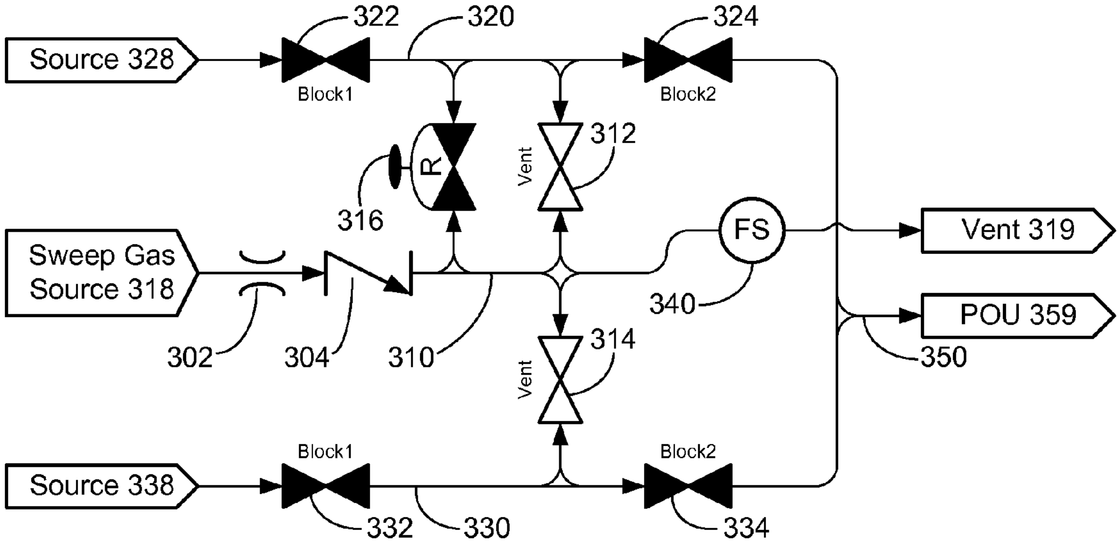
Figure 3C:
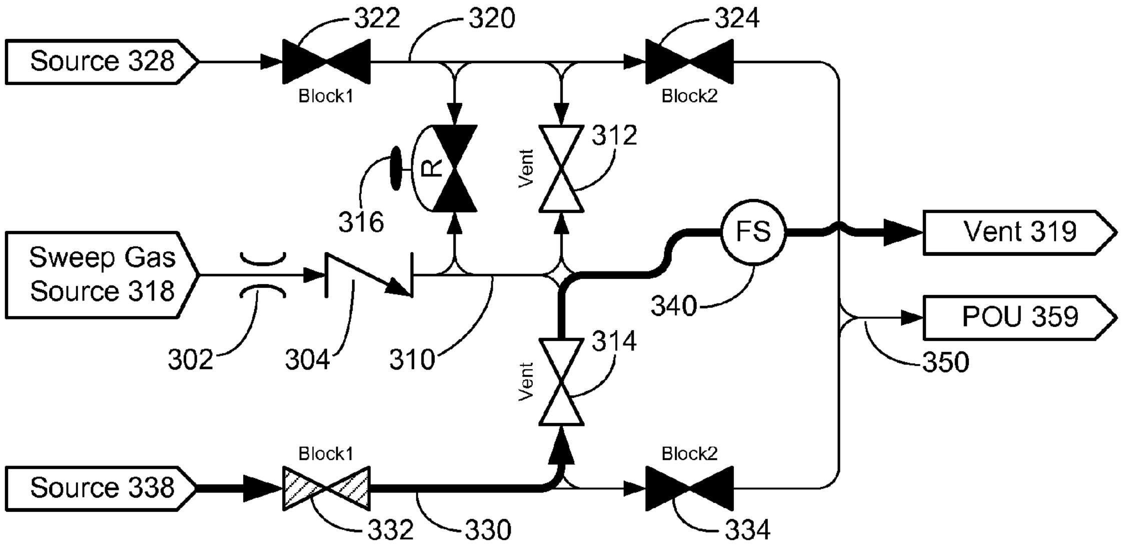

FIG. 3B illustrates a stop state when nothing is delivered (or dispensed) in the device. As shown, the two vent valves 312, 314 are open, and the block valves 322, 324, 332, 334 are closed. In this state, if either of the block valves 322, 332 leaks, the leaked water/slurry will flow through the vent line 310 and actuate the flow switch 340. FIG. 3C illustrates the situation where the block valve 332 leaks. As shown, the slurry leaked flows through the vent valve 314 into the vent line 310 and actuates the flow switch 340. As a result, the control system receives an actuate signal and properly determines that a leak event has occurred.

Figure 3D:
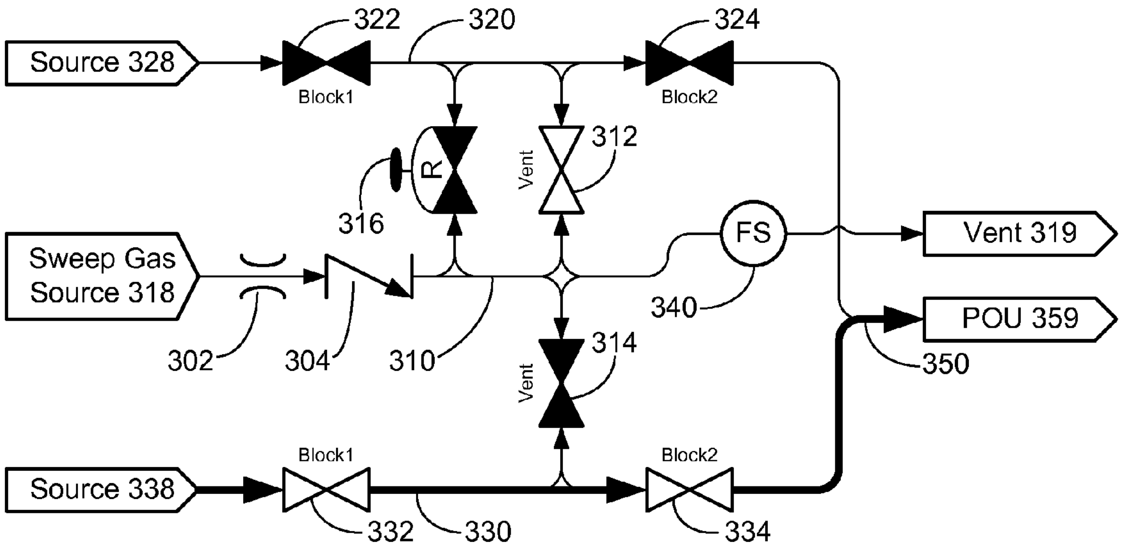
Figure 3E:
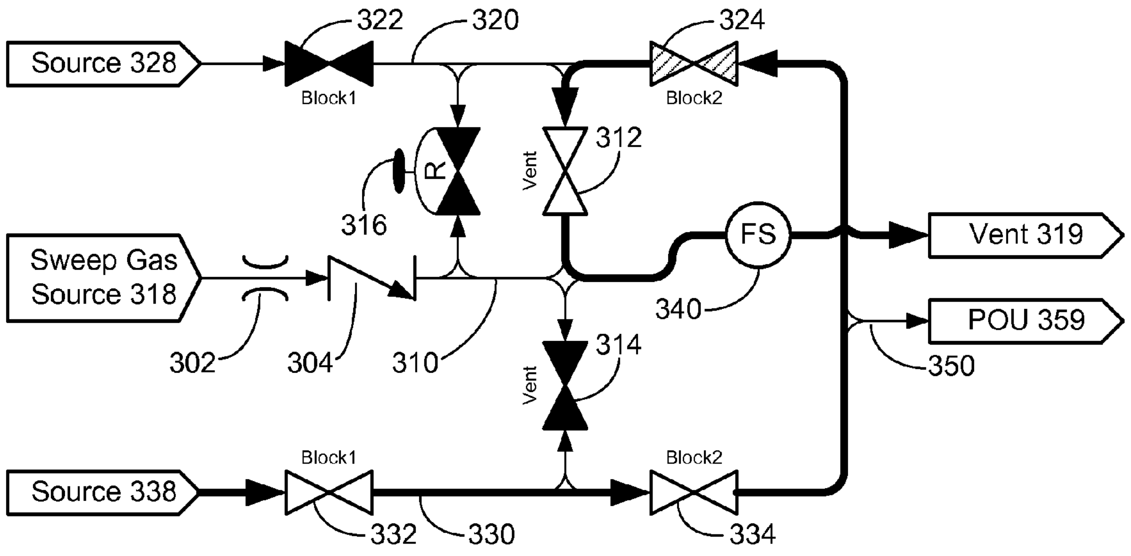
Figure 3F:
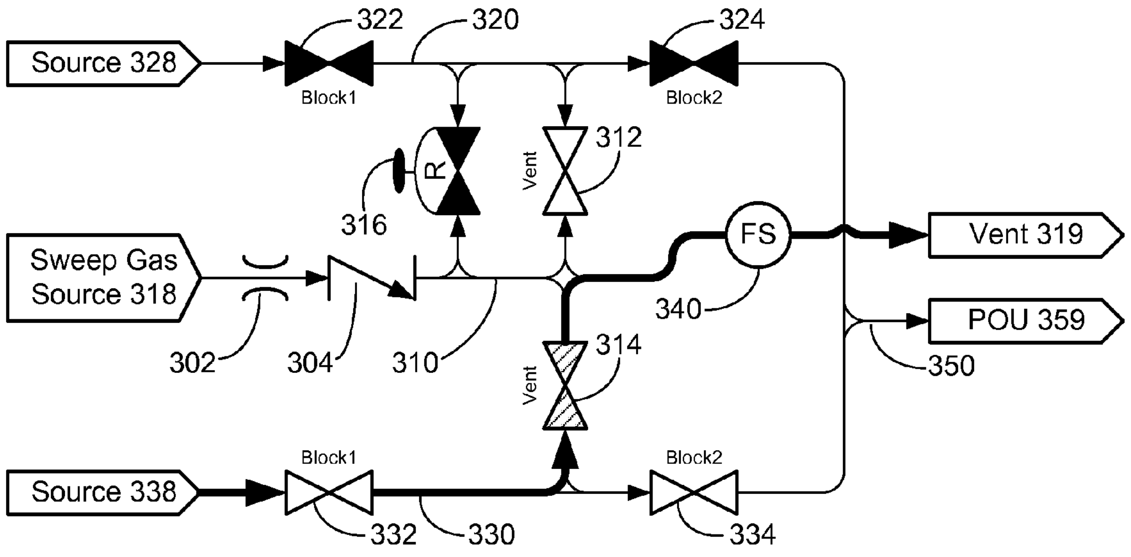

FIG. 3D illustrates a state when slurry is delivered. As shown, the block valves 332, 334 and the vent valve 312 are open, and the block valves 322, 324, the drain flush valve 316, and the vent valve 314 are closed. In this state, if any of the block valves 322, 324, the drain flush valve 316, or the vent valve 314 leaks, the leaked water/slurry will flow through the vent line 310 and actuate the flow switch 340. FIG. 3E illustrates the situation where the block valve 324 leaks, and FIG. 3F illustrates the situation where the vent valve 314 leaks. As shown, in both situations, the leaked slurry ends up actuating the flow switch 340 and flow down the vent line 310.

Figure 3G:
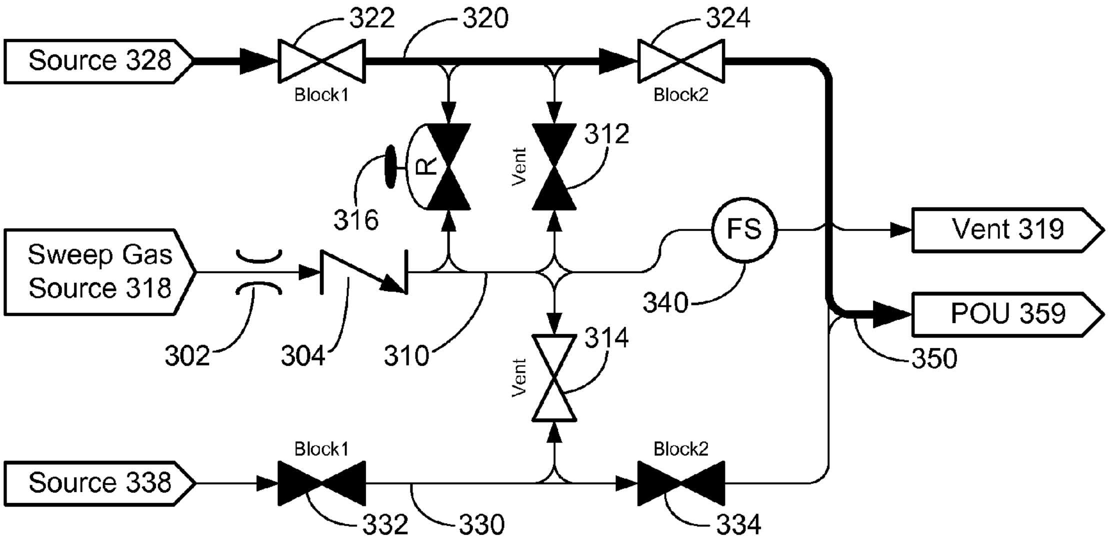

FIG. 3G illustrates a state when water is delivered. As shown, the block valves 322, 324 and the vent valve 314 are open, and the block valves 332, 334, the vent valve 312, and the restricted flow valve 316 are closed. In this state, if any of the closed valves leaks, the leaked water/slurry will actuate the flow switch 340 and flow down the vent line 310.

Figure 3H:
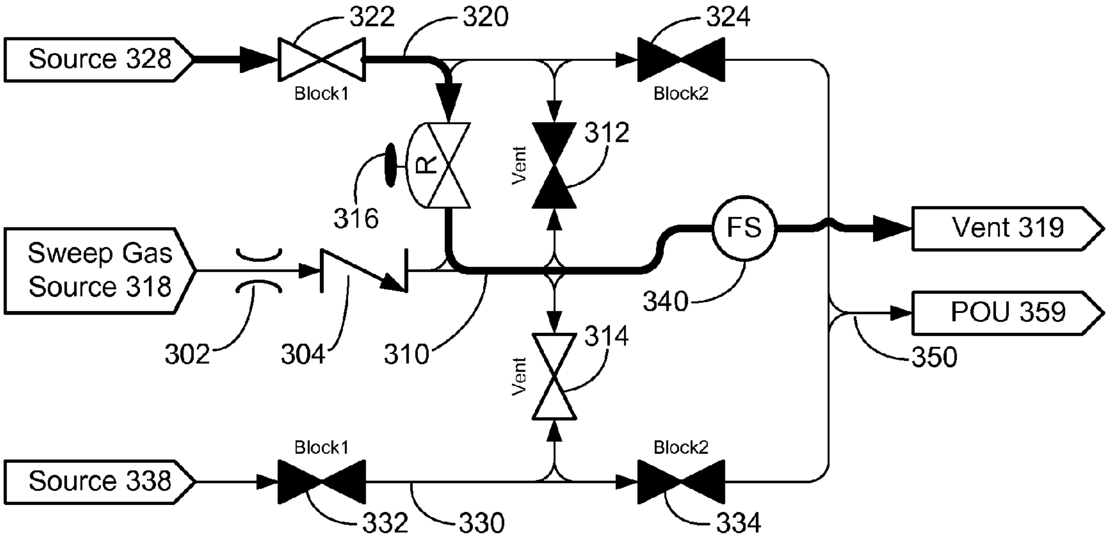
Figure 3I:
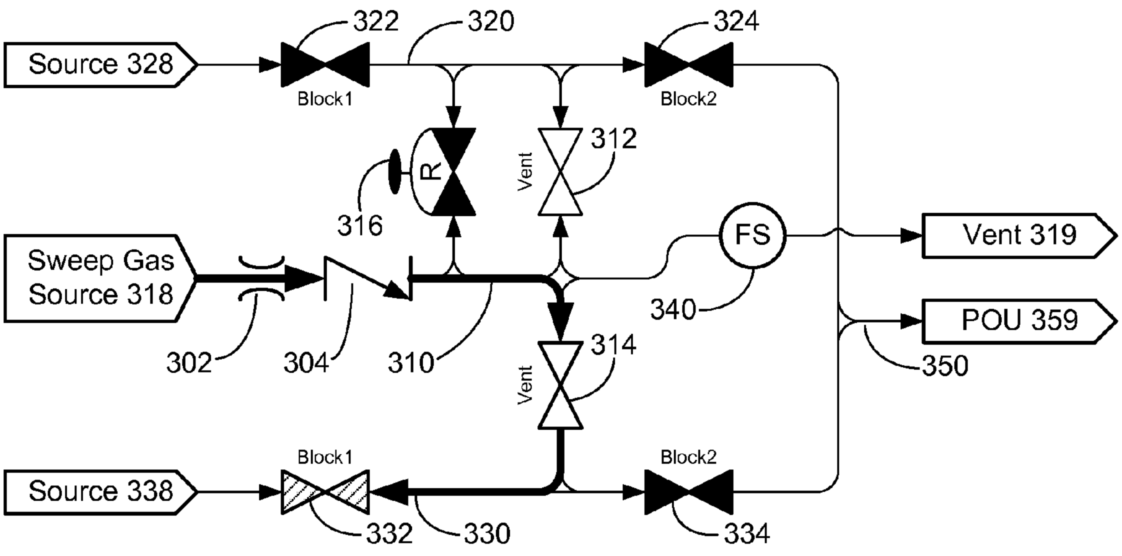

FIG. 3H illustrates a state when water is flushed through the vent line 310. As shown, the block valve 322 and the drain flush valve 316 are open and the water flushes through the vent line 310. Because the flow switch 340 should be actuated by the flush, the control system treats actuate signal from the flow switch 340 as confirmation that the leak detecting device functions as expected, and not as leakage indication.

FIG. 31 illustrates that the device can break backflow siphon developed within the system. As described above, siphon effect may cause vacuum to develop within a flow distribution system (e.g., due to loss of supply pressure in the source 338). The device breaks any potential backflow siphon by opening the corresponding vent valve(s) and sweeping the system with the process-inert gas. As a result, if a block valve leaks and vacuum develops on one side of the leaking valve, only the process-inert sweep gas is sucked in, and thereby prevents the backflows from contaminating the liquid. FIG. 31 illustrates the situation where the block valve 332 leaks and vacuum is developed near the source end of the leaking block valve 332. As shown, the process-inert sweep gas enters the supply line 330 through open vent valve 314, passes through the leaking block valve 332, and breaks the siphon without contaminating the high purity, bulk chemistry supply system.

Figure 4:
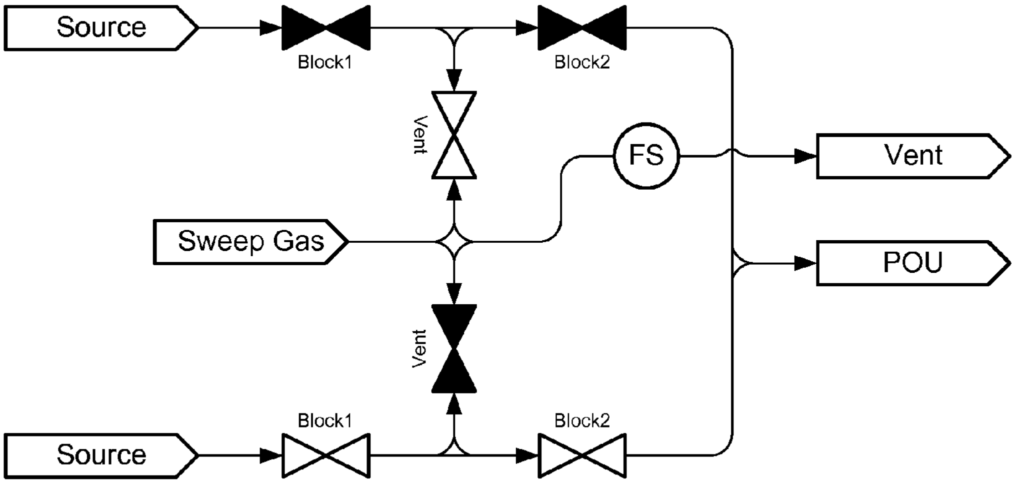
FIG. 4 is a diagram of a dual-channel apparatus for preventing backflow and detecting internal leaks in a flow control arrangement according to another embodiment.

One of ordinary skill can readily recognize that the described invention can be implemented in other variations and not limited to the illustrated examples. For example, the drain flush valve 316 shown in FIGS. 3A-I functions to sweep the vent line 310 with deionized water to flush any slurry that may have been deposited in the vent line 310. This function may not be necessary for certain settings and therefore the drain flush valve 316 may be removed from the device without affecting the device's function of preventing backflow and detecting leaks. FIG. 4 illustrates one such embodiment. In addition, the drain flush function can also be implemented differently without affecting the functions of the device. In addition, if no leakage detection is needed, the flow switch can be removed from the device.

Unless otherwise indicated, the valves in the described invention can be any kind of valves, such as check valves, wier valves, ball valves, pinch valves, poppet valves, cylinder valves, gate valves, cone valves, triaxial cone valves, plug valves, wafer valves, butterfly valves, and stop valves, to name a few. The control systems include a logic component for generating signals (e.g., control signal for opening/closing a valve, leak detection signal) and receiving signals (e.g., flow switch actuate signal). The logic component can include mechanical, pneumatic, hydraulic, or electronic circuits, for example.

What is claimed is:

1. An apparatus for reducing backflow, the apparatus comprising:

a plurality of supply inlets adapted to be connected to at least one corresponding supply source for a liquid;

a plurality of supply lines connecting the plurality of supply inlets to a point of use outlet, each supply line comprising a first valve, a first vessel, and a second valve in that order from a corresponding supply inlet to the point of use outlet;

a sweep gas inlet adapted to be connected to a sweep gas source, the sweep gas being inert relative to the liquid;

a vent line connecting the sweep gas inlet to a vent outlet, the sweep gas flowing from the sweep gas inlet to the vent outlet via the vent line, each supply line of the plurality of supply lines connected to the vent line through a separate corresponding one of a plurality of vent valves;

a plurality of branch lines connecting each first vessel of each supply line to the vent line, each branch line comprising a first end;

a junction connecting the first end of each branch line to the vent line; and a control system that:

in a liquid supply state, opens one of the first valves and opens a corresponding one of the second valves and closes the vent valve corresponding to the open first valve and the open second valve, the liquid flowing from the corresponding supply inlet to the point of use outlet via the corresponding open first valve, the corresponding first vessel, and then the corresponding open second valve, in that order, in a stop state, closes the previously opened first valve and closes the previously opened second valve corresponding to the previously opened first valve and opens the corresponding vent valve, such that the flow of sweep gas from the corresponding sweep gas inlet to the vent outlet sweeps out liquid in the first vessel corresponding to the closed first valve and second valve via the corresponding branch line to the vent outlet, the control system preventing backflow in the supply lines by opening the corresponding vent valve.

2. The apparatus of claim 1, wherein the sweep gas comprises a process-inert gas that does not contaminate the liquid for purposes of a process served by the liquid.

3. The apparatus of claim 2, wherein the process-inert gas comprises one of the following: air, purified nitrogen, or argon-helium mixture gas; and wherein the liquid comprises one of the following: chemical mechanical polishing slurry or deionized water.

4. The apparatus of claim 1, wherein the control system comprises a logic component for generating a control signal to open or close the vent valve, the logic component comprising a pneumatic circuit or an electronic circuit.

5. An apparatus for reducing backflow and detecting leaks in an interconnected pressurized liquid delivery system, the apparatus comprises:

a first supply inlet adapted to be connected to a first supply source for a first liquid;

a first supply line connecting the first supply inlet to a point of use outlet, the first supply line comprising a first valve, a first vessel, and a second valve in that order from the first supply inlet to the point of use outlet;

a second supply inlet adapted to be connected to a second supply source for a second liquid;

a second supply line connecting the second supply inlet to the point of use outlet, the second supply line comprising a third valve, a second vessel, and a fourth valve in that order from the second supply inlet to the point of use outlet;

a sweep gas inlet adapted to be connected to a sweep gas source, the sweep gas being inert relative to the first liquid and the second liquid and relative to processes served by the liquids;

a vent line connecting the sweep gas inlet to a vent outlet, the sweep gas flowing at a constant flow rate from the sweep gas inlet to the vent outlet via the vent line;

a first vent valve connecting the vent line with the first vessel;

a second vent valve connecting the vent line with the second vessel;

a flow switch disposed on the vent line between said two vent valves and the vent outlet for sensing fluid that flows through the vent line into the vent outlet, the flow switch configured to actuate responding to fluid passing through the vent line into the vent outlet exceeding the constant flow rate, wherein the fluid comprises the sweep gas and any leaked liquid; and a control system that:

in a first liquid supply state, opens the first valve, the second valve, and the second vent valve, and closes the third valve, the fourth valve, and the first vent valve, the liquid flowing from the first supply inlet to the point of use outlet via the first valve, the first vessel, and the second valve, in that order in a second liquid supply state, opens the third valve, the fourth valve, and the first vent valve, and closes the first valve, the second valve, and the second vent valve, the liquid flowing from the second supply inlet to the point of use outlet via the third valve, the second vessel, and the fourth valve, in that order, and in a stop state, closes the first valve, the second valve, the third valve, the fourth valve, and opens the first vent valve and the second vent valve such that the flow of sweep gas from the sweep gas inlet to the vent outlet sweeps out liquid in the first vessel and in the second vessel via the vent outlet.

* * * * *